United States Patent
Song et al.

(10) Patent No.: US 7,275,330 B2
(45) Date of Patent: Oct. 2, 2007

(54) THREE AXIAL DISPLACEMENT MEASURING APPARATUS

(75) Inventors: Gee-Wook Song, Daejeon (KR); Jung-Seob Hyun, Daejeon (KR); Bum Shin Kim, Daejeon (KR); Sun Young Cho, Kyunggi-do (KR)

(73) Assignee: Korea Electric Power Corporation (KR)

( * ) Notice: Subject to any disclaimer, the term of this patent is extended or adjusted under 35 U.S.C. 154(b) by 0 days.

(21) Appl. No.: 11/262,686

(22) Filed: Oct. 31, 2005

(65) Prior Publication Data
US 2006/0107542 A1 May 25, 2006

(30) Foreign Application Priority Data
Oct. 30, 2004 (KR) .................. 10-2004-0087605

(51) Int. Cl.
*G01B 5/004* (2006.01)
(52) U.S. Cl. ....................................... 33/503
(58) Field of Classification Search .................. 33/503
See application file for complete search history.

(56) References Cited

U.S. PATENT DOCUMENTS

| | | | | |
|---|---|---|---|---|
| 4,676,002 A | * | 6/1987 | Slocum ..................... | 33/1 MP |
| 4,679,331 A | * | 7/1987 | Koontz ...................... | 33/551 |
| 4,693,110 A | * | 9/1987 | Juengel ..................... | 73/1.81 |
| 4,982,504 A | * | 1/1991 | Soderberg et al. .......... | 33/503 |
| 5,251,156 A | * | 10/1993 | Heier et al. ............... | 33/503 |
| 5,259,119 A | * | 11/1993 | Yoshioka et al. ............ | 33/502 |
| 5,768,792 A | * | 6/1998 | Raab ........................ | 33/503 |
| 5,794,356 A | * | 8/1998 | Raab ........................ | 33/503 |
| 6,598,306 B2 | * | 7/2003 | Eaton ....................... | 33/503 |
| 6,681,495 B2 | * | 1/2004 | Masayuki et al. ........... | 33/503 |
| 6,772,619 B2 | * | 8/2004 | Nashiki et al. ............. | 73/1.79 |
| 6,817,108 B2 | * | 11/2004 | Eaton ....................... | 33/503 |
| 6,931,745 B2 | * | 8/2005 | Granger .................... | 33/503 |
| 7,051,447 B2 | * | 5/2006 | Kikuchi et al. .............. | 33/503 |
| 2005/0150123 A1 | * | 7/2005 | Eaton ....................... | 33/503 |
| 2005/0151963 A1 | * | 7/2005 | Pulla et al. ............ | 356/139.03 |
| 2006/0162175 A1 | * | 7/2006 | Stamenkovic ............... | 33/503 |

FOREIGN PATENT DOCUMENTS

| | | |
|---|---|---|
| JP | 06313710 A * | 11/1994 |
| JP | 2003-028625 | 1/2003 |
| KR | 10-0494232 | 6/2005 |
| WO | WO98/32571 | 7/1998 |

\* cited by examiner

*Primary Examiner*—Christopher W Fulton
(74) *Attorney, Agent, or Firm*—St. Onge Steward Johnston & Reens LLC

(57) ABSTRACT

Disclosed is a three-axial displacement measuring apparatus. The three-axial displacement measuring apparatus includes: a fixation grip fixed to one surface of a hanger supporting a structure to be measured; a universal joint connected to the fixation grip which is capable of rotating by 360 degrees; a link section being connected to the universal joint and having at least one angle sensor; an angle sensor section connected to the link section, for measuring angles; and a three-axial displacement measuring section for calculating three-axial displacement values of the measured structure by using the angle values measured by the angle sensor section.

9 Claims, 3 Drawing Sheets

THREE AXIAL DISPLACEMENT MEASURING APPARATUS

This application claims priority of Korean Application No. 2004-0087605 filed Oct. 30, 2004.

FIELD OF THE INVENTION

The present invention relates to a displacement measuring apparatus, and more particularly to a three-axial displacement measuring apparatus capable of precisely measuring three-axial displacements by using a link section of a joint structure, an angle sensor section precisely measuring displacements of a structure, and a three-axial displacement measuring section for calculating the three-axial displacement values of the measured structure by using the angle values measured by the angle sensor section.

BACKGROUND OF THE INVENTION

Currently, in the process industry of power plants, chemical plants, natural gas storage tanks, and the like, high temperature structures such as boilers, pipes, and the like are important elements, but the method for safe management of facilities determines the disorder of the facilities only by using interior and exterior image data through CCTVs and measuring the interior pressure and temperature of a structure, but does not precisely measure the displacement generated during the operation of the high temperature structure. Therefore, there is no means for preventing the damage of the facilities caused by stress concentration generated when the displacement during the operation exceeds the design value.

Especially, pipes widely used among the industrial facilities are inevitably necessary facilities for transferring the vapor generated in industrial boilers to power sources such as turbines. However, since the pipes various lengths and installation shapes, they generate various three dimensional displacements, according to the positions thereof, when operated.

The disorder of the pipes is determined by using support devices such as hangers, and measuring total unit displacements only in the vertical direction during the stop and the operation thereof in off line.

However, since many hangers are installed in each pipe, when a restriction is generated at one position of the pipe, the vertical displacements of adjacent hangers are generated as normal, but the horizontal displacements exceed the design values and cause various forms of damage. Thus, it is necessary to precisely measure the three-axial displacements generated during the operation of the structure.

In addition, in a case in which the structure, such as a pipe which is to be constantly measured, is installed at a position where it is dangerous to measure the structure, since operator is exposed to danger whenever measuring the structure, the measured data are not reliable. Further, although the life management and safety examination for the structure, such as a pipe and the like, is inevitably necessary, the three-axial displacement of the structure cannot be continuously measured and expensive equipment must be used.

The displacement measuring systems which have been used until now mainly measure one-dimensional displacement, and devices employing linear variable differential transformers (LVDT) of high cost, as well as lasers have been developed, but since three apparatuses should be attached at one position in order to measure the three-axial displacements, and since the apparatuses must be installed at various positions, considerable expenses are accrued when trying to measure the displacement of an entire facility.

Especially, since the installation shapes and positions of the pipes widely used among the industrial facilities are complex and the surrounding space is therefore small, measuring apparatuses of linear type are difficult to install for measuring three-axial displacement. Further, according to the conventional LVDT or the laser method, the direct engagement of a measuring apparatus and a high temperature structure is difficult to carry out due to the high surface temperature of the structure and separate heat radiating devices are needed.

SUMMARY OF THE INVENTION

Accordingly, the present invention has been made to solve the above-mentioned problems occurring in the prior art, and an object of the present invention is to provide a three-axial displacement measuring apparatus in which adjustment of the angles, according to the installation position thereof, is freely carried out by using a link section of a joint structure, thereby lessening the restrictions that result from the installing location thereof and enhancing the convenience of installation, in which the displacements of a structure can be precisely measured by using an angle sensor section and the measuring apparatus can be manufactured at a low cost, and in which the radiation of heat is maximized so that no additional heat radiating device is necessary, the hardness is enhanced, and the weight is lightened, by using a three-axial displacement measuring section having an outer case which uses an aluminum alloy of an increased cross-section and is hard plated.

In order to accomplish these objects, there is provided a three-axial displacement measuring apparatus comprising: a fixation grip fixed to one surface of a hanger supporting a structure to be measured; a universal joint connected to the fixation grip and capable of rotating by 360 degrees; a link section connected to the universal joint and having at least one angle sensor; an angle sensor section connected to the link section, for measuring angles; and a three-axial displacement measuring section for calculating three-axial displacement values of the measured structure by using the angle values measured by the angle sensor section.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE DRAWINGS

Hereinafter, a preferred embodiment of the present invention will be described in detail with reference to the accompanying drawings, so that those skilled in the art can easily carry out the present invention. The objects, operations, effects, characteristics, and operational advantages of the present invention will be clear by explaining the preferred embodiment of the present invention.

For reference, the preferred embodiment disclosed herein is selected from a number of examples, all of which can be carried out, in order to help those skilled in the art to understand the present invention, and various modifications, additions and substitutions are possible, without departing from the scope and spirit of the invention.

Figure 1:
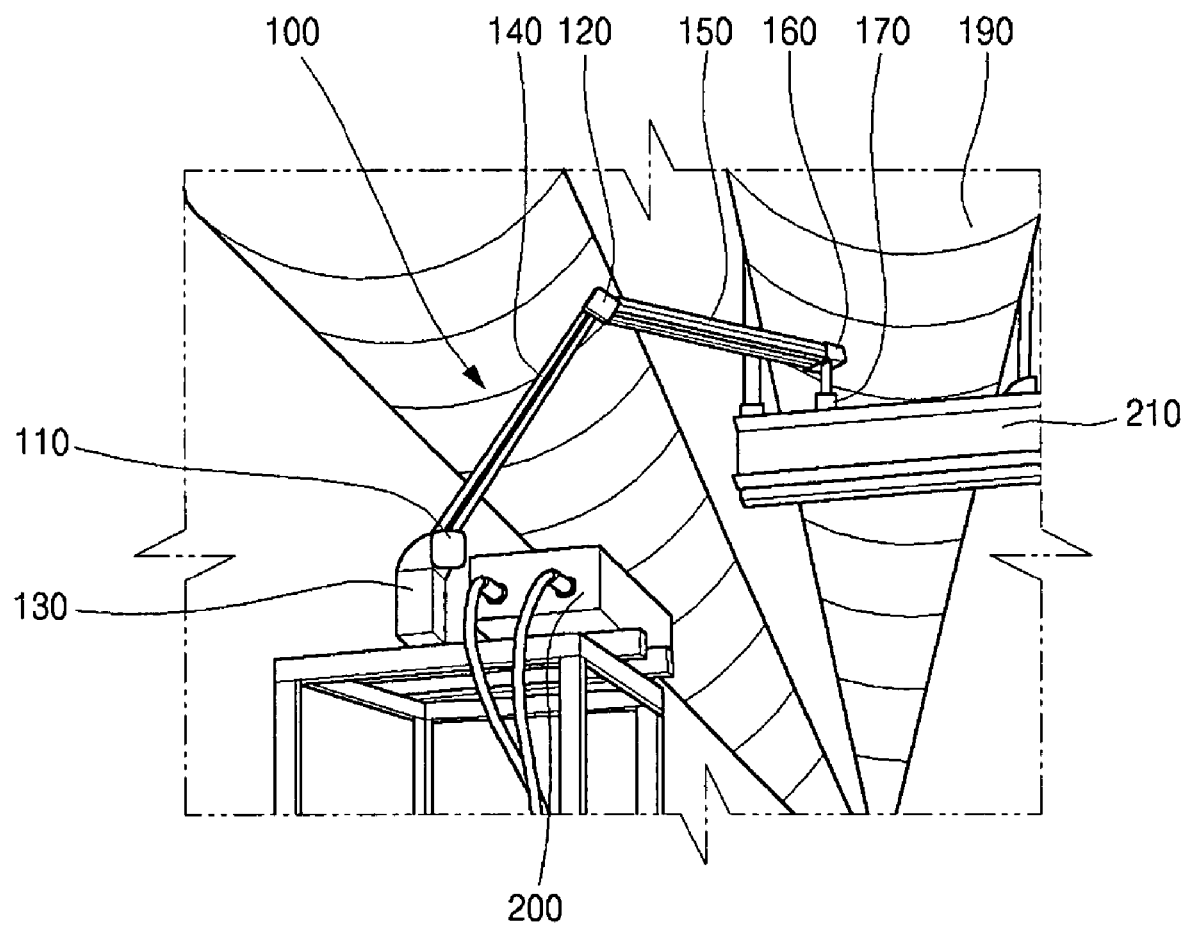
FIG. 1 is a view for showing an installation state of a three-axial displacement measuring apparatus according to a preferred embodiment of the present invention.

FIG. 1 is a view for showing an installation state of a three-axial displacement measuring apparatus according to a preferred embodiment of the present invention.

Figure 2:
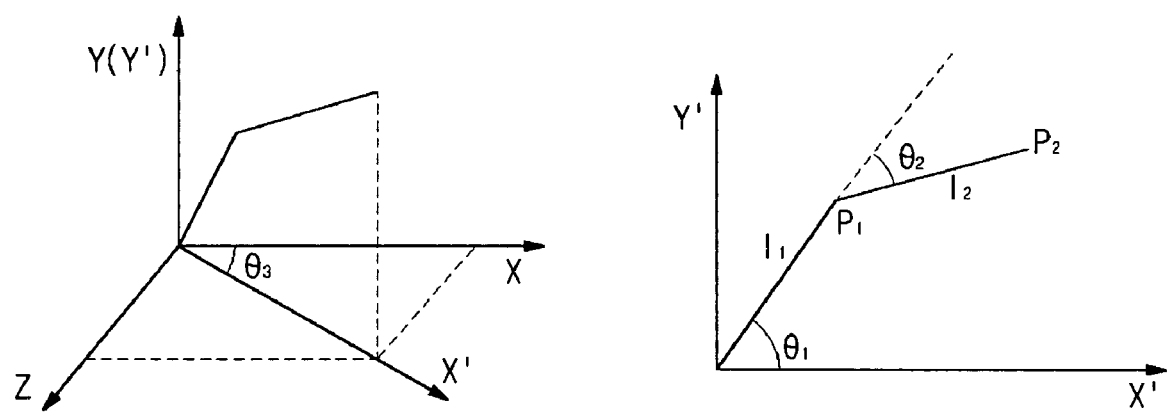
FIG. 2 is a graph for showing the displacement measurement concept of a three-axial displacement measuring apparatus according to a preferred embodiment of the present invention.

FIG. 2 is a graph for showing the displacement measurement concept of the three-axial displacement measuring apparatus according to the preferred embodiment of the present invention.

Figure 3:
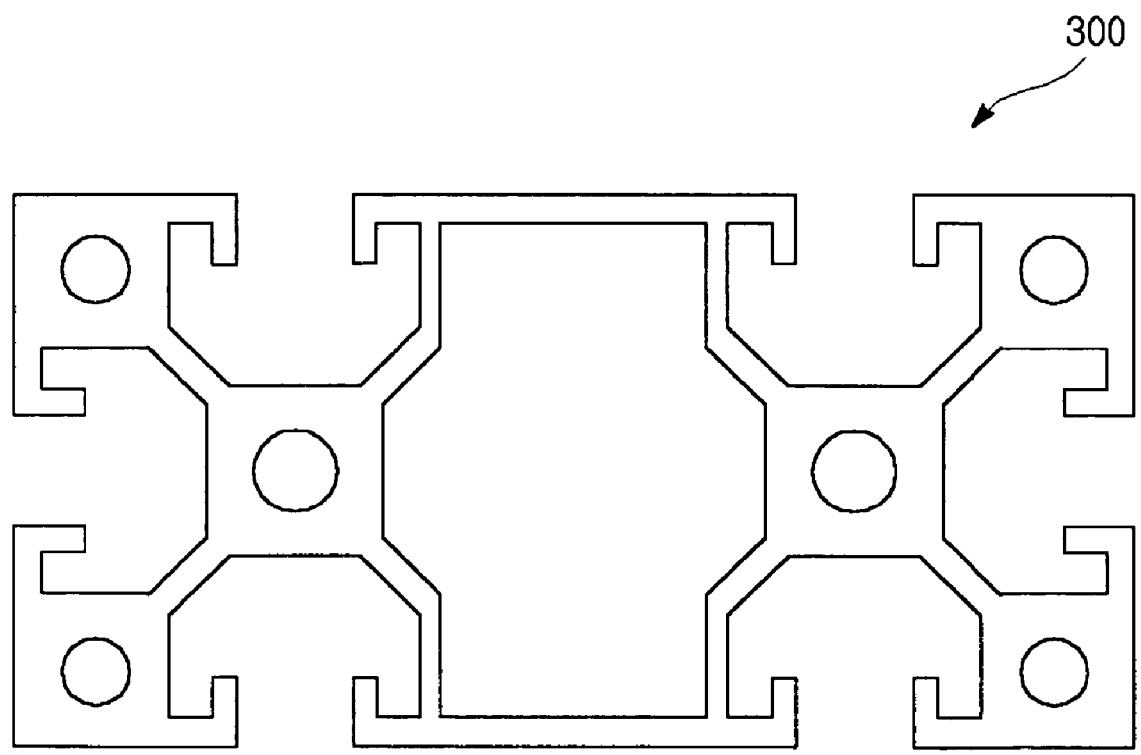
FIG. 3 is a cross-sectional view for showing an outer case of a three-axial displacement measuring section according to a preferred embodiment of the present invention.

FIG. 3 is a cross-sectional view for showing an outer case of a three-axial displacement measuring section according to the preferred embodiment of the present invention.

As shown in FIGS. 1 to 3, the three-axial displacement measuring apparatus, according to a preferred embodiment of the present invention, includes a fixation grip 170 fixed to one surface of a hanger 210 supporting the structure to be measured, a universal joint 160 connected to the fixation grip 170 and capable of rotating by 360 degrees, a link section 140 and 150 connected to the universal joint 160 and having at least one angle sensor, an angle sensor section 110, 120, and 130 connected to the link section 140 and 150, for measuring angles, and a three-axial displacement measuring section 200 for calculating three-axial displacement values of the measured structure by using the angle values measured by the angle sensor section 110, 120, and 130.

The fixation grip 170 is formed of a material having superior thermal resistance, hardness, and corrosion resistance, and has a U-shape.

The universal joint 160 is formed of an aluminum alloy, has the fixation grip 170 moved in connection with the movement of the hanger 210, and moves in connection with the movement of the fixation grip 170 so as to have free moment.

The link section 140 and 150 is formed of an aluminum alloy and includes a first link 140 ($l_1$) and a second link 150 ($l_2$) to constitute a joint structure.

The angle sensor section 110, 120, and 130 is formed of an aluminum alloy and includes a first angle sensor 110 ($\theta_1$), a second angle sensor 120 ($\theta_2$), and a third angle sensor 130 ($\theta_3$).

The first angle sensor 110 ($\theta_1$) measures the angle between the first link 140 ($l_1$) and a fixed plane, with the fixation grip 170 acting as the fixed plane.

The second angle sensor 120 ($\theta_2$) connects the first link 140 ($l_1$) and the second link 150 ($l_2$) and measures the angle between the two links.

The third angle sensor 130 ($\theta_3$) measures the plane rotation angle on the fixed plane.

The three-axial displacement measuring section 200 has a hard plated outer case 300 using an aluminum alloy of an increased cross-section in order to secure the safety of the sensors, lower the weight, and enhance the radiation of heat.

Hereinafter, the operation of the three-axial displacement measuring apparatus according to the preferred embodiment of the present invention will be described.

The three-axial displacement measuring apparatus 100 is not directly attached to a pipe 190, which is the structure to be measured. Instead, one side of the three-axial displacement measuring apparatus 100 is fixed to one surface of a hanger 210 supporting the pipe 190 through the fixation grip 170.

The universal joint 160, capable of rotating by 360 degrees, is connected to the fixation grip 170 so that the fixation grip 170 is moved in connection with the movement of the hanger 210, and is moved in connection with the movement of the fixation grip 170 so as to have the free moment.

One side of the second link 150 ($l_2$) of the link section 140 and 150 is connected to the universal joint 160 and the other side thereof is connected to the second angle sensor 120 ($\theta_2$) of the angle sensor section 110, 120, and 130, so that the second link 150 ($l_2$) of the link section 140 and 150 forms a joint structure together with the first link 140 ($l_1$) of the link section 140 and 150.

One side of the first link 140 ($l_1$) of the link section 140 and 150 is connected to the second angle sensor 120 ($\theta_2$) of the angle sensor section 110, 120, and 130 and the other side thereof is connected to the first angle sensor 110 ($\theta_1$) of the angle sensor section 110, 120, and 130.

The first angle sensor 110 ($\theta_1$) of the angle sensor section 110, 120, and 130 measures the angle between the first link 140 ($l_1$) of the link section 140 and 150 and the fixed plane, with the fixation grip 170 being the fixed plane. The second angle sensor 120 ($\theta_2$) of the angle sensor section 110, 120, and 130 connects the first link 140 ($l_1$) of the link section 140 and 150 and the second link 150 ($l_2$) of the link section 140 and 150 and measures the angle between the two links.

The third angle sensor 130 ($\theta_3$) of the angle sensor section 110, 120, and 130 is connected to one side of the first angle sensor 110 ($\theta_1$) of the angle sensor section 110, 120, and 130 in order to measure the plane rotation angle on the fixed plane.

The three-axial displacement measuring section 200 is fixed to the fixed plane and calculates three-axial displacement values of the measured structure, i.e. the pipe, by using the angle values measured by the angle sensor section 110, 120, and 130.

The three-axial displacement section 200 has the outer case 300, which has an increased cross-section as shown in FIG. 3 in order to secure the safety of the sensors and enhance the radiation of heat.

In this manner, the three-axial displacement measuring apparatus 100 is stably fixed through the fixation grip 170 and the three-axial displacement measuring section 200.

In order to check the behavior of the pipe 190 which is a structure to be measured, the stably fixed three-axial displacement measuring apparatus 100 defines the direction of the vapor flown along the pipe 190, i.e. the axial direction of the pipe 190, as the Z-axis, defines the direction of the hanger 210 installed in the pipe 190, i.e. the vertical direction of the pipe 190 along which the pipe 190 is deformed, as the Y-axis, and defines the X-axis according to the right-hand rule.

Further, as shown in FIG. 2, the three dimensional coordinate system is used to indicate one point in space, and the three dimensional coordinate system has the X-axis, the Y-axis, and the Z-axis.

In order to measure the three dimensional displacement of the pipe 190, the position of one point moved in three dimension is calculated by combining the two links 140 and 150 and the three angle sensors 110, 120, and 130.

Here, the coordinates of P1 are $P_{1x}^{1}=l_1 \cos\theta_1$ and $P_{1y}^{1}=l_1 \sin\theta_1$, and the coordinates of P2 are $P_{2x}^{1}=l_2 \cos(\theta_1-\theta_2)+l_1 \cos\theta_1$ and $P_{2y}^{1}=l_2 \sin(\theta_1-\theta_2)+l_1 \sin\theta_1$. The actual coordinate values are $P_{2x}=\cos\theta_3 P_{2x}^{1}$, $P_{2y}=P_{2y}^{1}$, and $P_{2z}=\sin\theta_3 P_{2x}^{1}$, and $P_{2x} = \cos\theta_3 \{l_2 \cos(\theta_1-\theta_2)+l_1 \cos\theta_1\}$, $P_{2y}=l_2 \sin(\theta_1-\theta_2)+l_1 \sin\theta_1$, and $P_{2z}=\sin\theta_3 l_2 \cos(\theta_1-\theta_2)+l_1 \cos\theta_1$.

According to the three-axial displacement measuring apparatus implemented in the preferred embodiment of the present invention, the adjustment of the angles according to the installation position thereof is freely carried out by using a link section of a joint structure, thereby lessening the number of restrictions concerning the installation location thereof and enhancing the convenience of the installation. Further, the displacements of a structure can be precisely measured by using an angle sensor section, and the measuring apparatus can be manufactured at a low cost. Further, the radiation of heat is maximized so that no additional heat radiating device is necessary, the hardness is enhanced, and the weight is lightened, by using a three-axial displacement measuring section having an outer case which uses an aluminum alloy having an increased cross-section and is hard plated.

What is claimed is:

1. A three-axial displacement measuring apparatus comprising:
    a fixation grip fixed to one surface of a hanger supporting a structure to be measured;
    a universal joint connected to the fixation grip and formed of an aluminum alloy wherein the universal joint is capable of rotating by 360 degrees, has the fixation grip moved in connection with the movement of the hanger and moves in connection with the movement of the fixation grip so as to have free moment;
    a link section being connected to the universal joint;
    an angle sensor section connected to the link section and having at least one angle sensor, for measuring angles; and
    a three-axial displacement measuring section for calculating three-axial displacement values of the measured structure by using the angle values measured by the angle sensor section.

2. A three-axial displacement measuring apparatus according to claim 1, wherein the fixation grip is formed of a material having superior thermal resistance, hardness, and corrosion resistance.

3. A three-axial displacement measuring apparatus according to claim 1, wherein the link section is formed of an aluminum alloy and includes a first link and a second link to constitute a joint structure.

4. A three-axial displacement measuring apparatus according to claim 1, wherein the angle sensor section is formed of an aluminum alloy and includes a first angle sensor, a second angle sensor, and a third angle sensor.

5. A three-axial displacement measuring apparatus according to claim 4, wherein the first angle sensor measures the angle between the first link and a fixed plane, with the fixation grip being the fixed plane.

6. A three-axial displacement measuring apparatus according to claim 4, wherein the second angle sensor connects the first link and the second link and measures the angle between the two links.

7. A three-axial displacement measuring apparatus according to claim 4, wherein the third angle sensor measures the plane rotation angle on the fixed plane.

8. A three-axial displacement measuring apparatus according to claim 1, wherein the three-axial displacement measuring section has a hard plated outer case using an aluminum alloy having an increased cross-section in order to secure the safety of the sensors, lower the weight, and enhance the radiation of heat.

9. A three-axial displacement measuring apparatus comprising:
    a fixation grip fixed to one surface of a hanger supporting a structure to be measured;
    a universal joint connected to the fixation grip, the universal joint being capable of rotating by 360 degrees;
    a link section being connected to the universal joint and having at least one angle sensor;
    an angle sensor section connected to the link section, for measuring angles;
    a three-axial displacement measuring section for calculating three-axial displacement values of the measured structure by using the angle values measured by the angle sensor section;
    the angle sensor section includes a first angle sensor, a second angle sensor, and a third angle sensor;
    wherein the first angle sensor measures the angle between the first link and a fixed plane, with the fixation grip being the fixed plane;
    wherein the second angle sensor connects the first link and the second link and measures the angle between the two links; and
    wherein the third angle sensor measures the plane rotation angle on the fixed plane.

* * * * *